(12) United States Patent
Greenspan (10) Patent No.: US 8,817,937 B2
(45) Date of Patent: Aug. 26, 2014

(54) SYSTEM AND METHOD FOR PERFORMING TIMING CONTROL

(71) Applicant: Intel Corporation, Santa Clara, CA (US)

(72) Inventor: Daniel Greenspan, Jerusalem (IS)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/683,338

(22) Filed: Nov. 21, 2012

(65) Prior Publication Data

US 2014/0140459 A1 May 22, 2014

(51) Int. Cl.
*H04L 7/00* (2006.01)
(52) U.S. Cl.
USPC ............ 375/371; 375/354; 375/356; 375/357

(58) Field of Classification Search
USPC .................................. 375/371, 354, 356, 357
See application file for complete search history.

(56) References Cited

U.S. PATENT DOCUMENTS

| | | | |
|---|---|---|---|
| 5,852,630 A * | 12/1998 | Langberg et al. | 375/219 |
| 2009/0285061 A1 * | 11/2009 | Nagai | 369/47.3 |
| 2009/0286564 A1 * | 11/2009 | Ho | 455/502 |
| 2010/0054387 A1 * | 3/2010 | Wu et al. | 375/376 |

* cited by examiner

*Primary Examiner* — Siu Lee
(74) *Attorney, Agent, or Firm* — KED & Associates (57) ABSTRACT

A timing control apparatus includes an adder and a comparator. The adder adds unused time error in each of a plurality of periods to form a cumulative value, and the comparator compares the cumulative value to a reference value. The unused time error is computed during operation of a first clock, and a control signal is generated to switch from the first clock to a second clock based on an output of the comparator. The frequency of the first clock is greater than a frequency of the second clock.

22 Claims, 7 Drawing Sheets

SYSTEM AND METHOD FOR PERFORMING TIMING CONTROL

FIELD

One or more embodiments herein relate to controlling timing in a system.

BACKGROUND

A considerable amount of power consumption in mobile and other computing devices may be attributed to the use of high-speed clock, timer, or counter circuits at times when the signals from these circuits may not be necessarily needed or when other circumstances arise.

DETAILED DESCRIPTION

Figure 1:
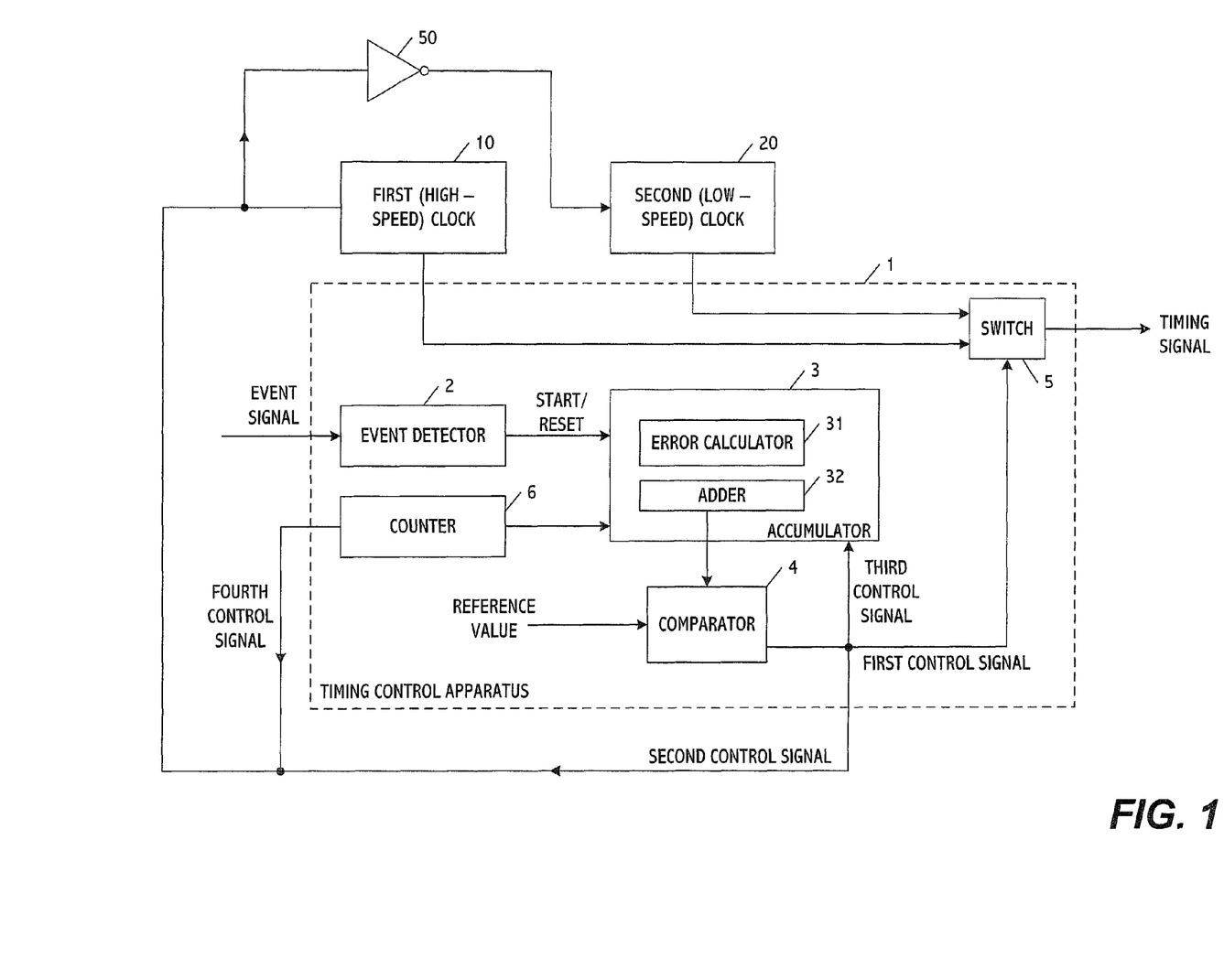
FIG. 1 shows one embodiment of a timing control apparatus.

FIG. 1 shows one embodiment of a timing control apparatus 1 for generating a timing signal for use in an electronic device. The device may be a notebook or other type of computer, smart phone, pad- or pod-type device, media player, navigation or gaming system or any other electronic device or system which operates based on timing or clock signals. In accordance with one particular embodiment, the timing signals are used in devices that include system-on-chip (SoC) or chipsets used in a computing system.

The timing signal is generated based on an output of one of a first clock 10 and a second clock 20. The first clock may have an operating frequency greater than the second clock, and accordingly for this application the first clock may be referred to as a high-speed clock and the second clock may be referred to as a low-speed clock. The operating frequencies of the clocks may be based on the specific application of the timing signal and/or the device or system in which the timing control apparatus is included or to which the timing control apparatus is coupled. In one example, the timing signal corresponds to a high precision event timer signal used in a personal computer.

In one implementation, the timing signal may correspond directly to the output of the first or second clock. Alternatively, the output of the first or second clock may pass through one or more circuits or may otherwise be manipulated before the timing signal is output for controlling or use in the electronic device.

As shown in FIG. 1, the timing control apparatus includes an event detector 2, an accumulator 3, a comparator 4, and a switch 5. The event detector 2 controls the operation of the timing control apparatus based on receipt of an event signal. In one embodiment, the event signal may be generated by a central processing unit (CPU) or other processor of the host device or system and/or may be generated by operating system or other control software for performing applications or other operations. In another embodiment, the event signal may be an interrupt signal generated by a control circuit or detection circuit. In still other embodiments, the event signal may correspond to a condition for event that is certain to occur or any access by the CPU or device to the counter value. This even may occur transparently and may not require a software change.

The output of the event detector 2 depends on whether or not an event signal has been received. During a period of time when an event signal has not been received, the event detector 2 may not have any output or may output a signal of a certain value, e.g., a predetermined logical value. When an event signal is received, the event detector 2 may output a reset signal for resetting the timing control apparatus. In accordance with one embodiment (to be discussed in greater detail), the reset signal allows for switching between the clocks to provide more efficient operation at least from a power management standpoint.

The accumulator 3 may be a processor or counter circuit that performs two functions, or alternatively may be implemented in software code. The first function involves determining a difference between an actual error in timing accuracy that may have occurred over a predetermined period of time and a maximum or tolerable error within that time period. In one embodiment, the maximum or tolerable error may be a worst-case error that may have occurred over the period. In other embodiments, an error different from a worst-case error may be taken in to consideration. The maximum or tolerable error may be determined, for example, based on an operating specification of the host device or system or the application which is to use the timing signal that is to be output from the timing control apparatus.

Figure 2:
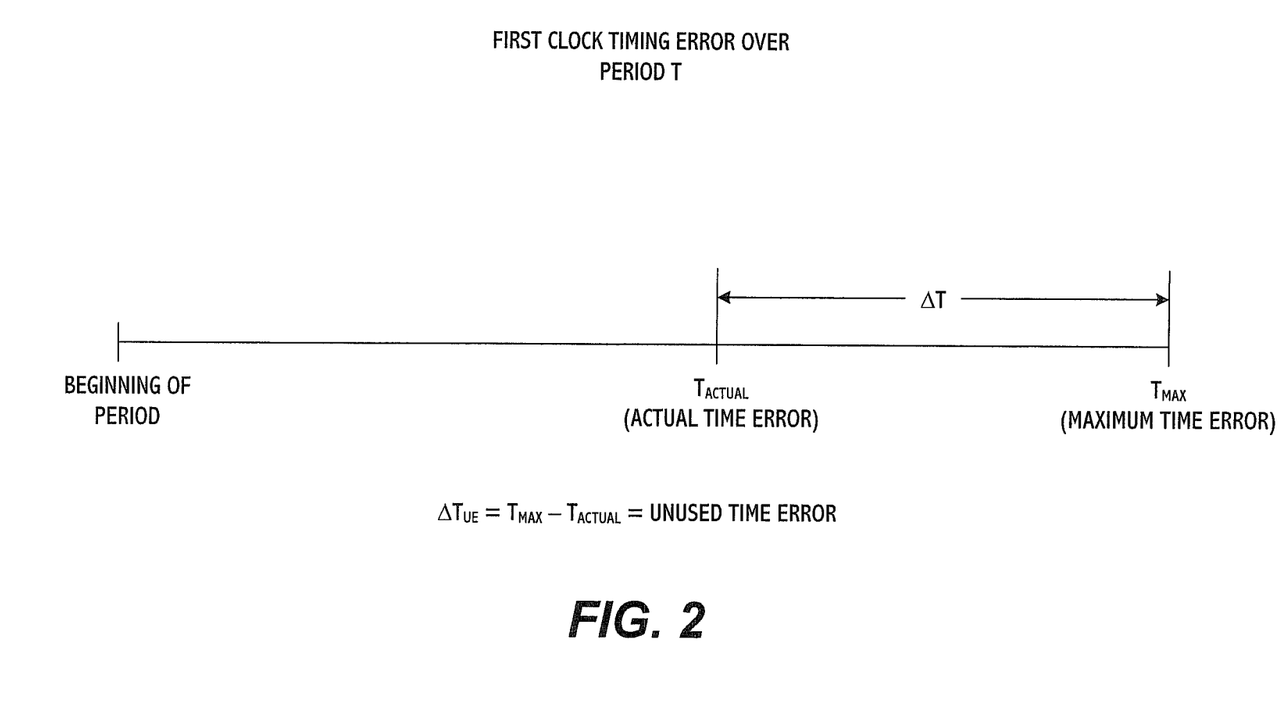
FIG. 2 shows an example of unused error that occurs during a time period.

FIG. 2 shows an example of the time difference determined by the accumulator in accordance with its first function. In this example, the value $T_{Actual}$ corresponds to the actual worst-case positive timing error during a given time period and the value $T_{Max}$ corresponds to the maximum duration of that time period while the first clock 10 is active and the second clock 20 is inactive or otherwise is not contributing to the generation of the timing signal. Stated differently, the actual timing error may correspond to the error (or drift) in the first clock 10 over the given time period. Additionally or alternatively, a similar calculation may performed for error in a minimal duration of the time period.

The actual timing error may be determined by an error calculator 31 in the accumulator 3. This calculator may compute the error (or drift) in accuracy of the first clock output in the period, for example, based on one or more known parameters including the maximal error in frequency of the first clock 10 as its current operating temperature and/or based on a fixed predetermined value set during the design phase.

The difference in the actual timing error and the maximum or tolerable timing error may be referred to as the unused error (or unused time error), e.g., $\Delta T = T_{Max} - T_{Actual}$. Conceptually, the unused timing error may represent the amount of additional drift or time error that could have occurred in the first clock output before the tolerance or maximum timing error is violated. The maximum timing error, therefore, may be considered to be a built-in tolerable error that the first clock 10 can experience in the given time period and still be within operating requirements.

When the actual timing error is less than the maximum or tolerable timing error, the difference ($\Delta T$) may be considered to be unused error that the first clock output could have experienced and still be within tolerance limits for a given device or system application. In accordance with one embodiment, this unused error may be saved (or banked) for use at a later time for purposes of switching between the clocks.

The second function involves accumulating or otherwise computing an aggregate sum of the unused errors ($\Delta T$) over a plurality of time periods (e.g., $T_{Max}$ periods). The aggregate sum may be considered to correspond to a cumulative error computed and/or stored in an adder 32, which may be located in or coupled to the accumulator 3 and which may be implemented software or hardware, or a combination. The cumulative error (or unused drift) may represent the sum of the unused timing errors that occur over the plurality of time periods; this error, therefore, may be said to be "banked" by the adder 32 for future use as will be described in greater detail below.

Figure 3:
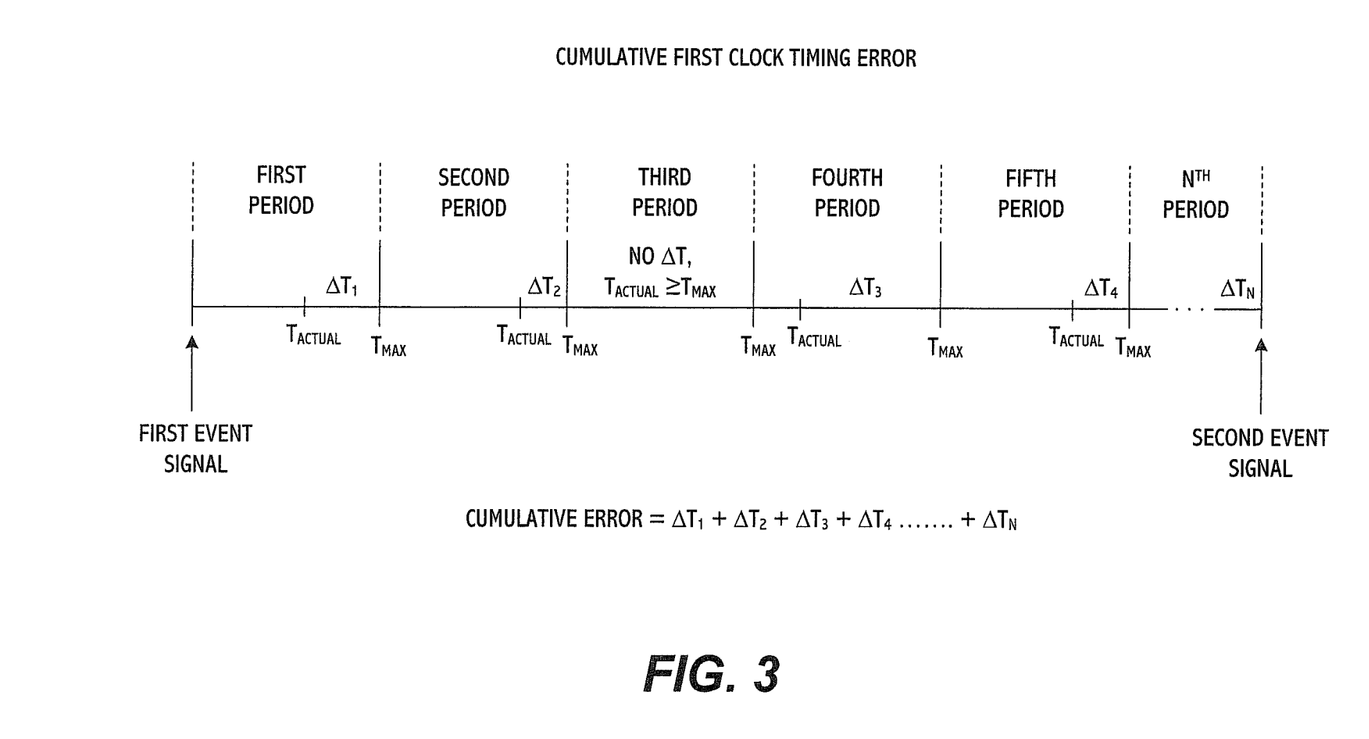
FIG. 3 shows an example of cumulative error computed by the apparatus.

FIG. 3 shows an example of how the cumulative error may be computed by the adder 32. In this example, a timeline is shown to include a plurality of time periods that are substantially of equal duration. The time periods correspond to the period shown in FIG. 2 having a maximum duration of $T_{Max}$. In each period, the time difference ($\Delta T$) corresponding to the unused error may be different. In the first period, the unused timing error is greater than the unused timing error in the second period.

The cumulative error may be represented by a sum of the unused timing errors in each period, which in this case is illustratively represented as $\Delta T_1 + \Delta T_2 + \Delta T_3 + \Delta T_4 + \Delta T_N$. The total time period over which the cumulative error is computed may be determined in various ways. In one embodiment, the total time period of the cumulative error corresponds to the time between consecutive or successive event signals. Thus, in FIG. 3, the total time period is the time between a first event signal and a second event signal, which, for example, may be indicative of different times a CPU or software of the host device or system performs a read operation of a counter or the timing control apparatus and/or different times interrupt signals are generated.

In FIG. 3, the second event signal is shown as corresponding to the end of a period; however, the second event signal may occur during a period. In this case, the portion of the last period in which the second event signal occurred may be disregarded for purposes of computing the cumulative error. Conceptually, the cumulative error may be considered to be that total time between event signals that may be taken into consideration for switching between the first and second clocks.

Because the second clock has a lower frequency (e.g., greater count increment than the count increment of the first clock) or may be running to support other system functions, operating the second clock for a time that corresponds to or is based on the cumulative error instead of the first clock may result in significant power savings while the host device or system is powered on by changing the counter value less frequently or allowing the first clock to be shut down, or both.

Returning to FIG. 1, as the cumulative error is computed (but before the second event signal is received), the comparator 4 compares the cumulative error to a reference value one or more times. The comparator may performs this comparison, for example, after every $T_{Max}$ period, after a predetermined time interval different from the $T_{Max}$ period, and/or based on a received control signal requesting that the comparison be performed or which is otherwise scheduled by operating system or other control software.

The reference value used by the comparator may correspond to a predetermined cumulative unused error value. This value may be set by a designer or manufacturer based on, for example, expected non-cumulative inaccuracy caused by the large increments in counting when counting is performed on the slow clock. The value can be set even higher if it is desired to operate for an extended time on a second clock that has lower accuracy than the maximum or tolerable error.

The reference value used by the comparator 4 may further be adjusted if it is known at the time that events cannot take place during a certain length of upcoming time. For example, if the event is triggered by a CPU read of the counter value, and it is known that the CPU is sleeping, that the CPU cannot read the counter value while sleeping, and that CPU will take at least a known time to exit from sleep, the reference value may be reduced according to the additional cumulative error that can be relied on to accumulate before the CPU can be awake.

As long as the cumulative error does not exceed the reference value, the first clock output continues to be used in generating the timing signal from the timing control apparatus. However, when the cumulative error exceeds the reference value, a determination is made that enough time error has been accumulated (or "banked") that will allow the second clock 20 to operate in place of the first clock 10. If the second clock 20 has lower accuracy than the maximum or tolerable error, then operation on the second clock 20 may be limited to a time that corresponds to or is based on the cumulative error caused by this inaccuracy, after taking into account the accumulated error to cover non-cumulative inaccuracy caused by the large steps in counting.

When the reference value is exceeded, the comparator 4 outputs three control signals. The first control signal is sent to a switch 5 to switch generation of the timing signal from the first clock output to the second clock output. The second control signal is output to activate the second clock 20 and deactivate the first clock 10. The third control signal is output to the accumulator 3 to cause the cumulative error (or a value based on the cumulative error) to be loaded into a counter 6. The counter 6 controls the time the second clock 20 is activated and the first clock 10 is deactivated.

In accordance with one embodiment, another control signal may be generated and sent to the recipient of the timing signal to indicate that counting may be performed according to the second clock signal such as to count in larger increments. This control signal may be generated based on the output of the comparator or may be output from the event detector or a processor circuit.

When the counter 6 counts down to zero (or another predetermined value), the counter 6 outputs a fourth control signal to activate the first clock 10 and to deactivate the second clock 20. The second control signal and fourth control signal may have opposite logical values. Thus, the first clock 10 is deactivated and the second clock 20 is activated when the second clock signal has a first logical value and the fourth clock signal has a second logical value. And, the first clock 10 is activated and the second clock 20 is deactivated when the second clock signal has a second logical value and the fourth clock signal has a first logical value. Because the second clock 20 has a higher count increment (and thus lower operational frequency) compared to the first clock 10, a significant power savings may be achieved by operating the second clock 20 in place of the first clock 10 during the cumulative error time.

The inverter 50 allows operation of the first and second clocks to alternate based on the second and fourth control signals. In an alternative embodiment, the counter function may be achieved by having the accumulator count down.

When the second event signal (or any event signal) is received, the event detector 2 generates a reset signal to set the error calculator 31 and the adder 32 of the accumulator 3 to initial values (e.g., zero) to clear the accumulated (banked) error, as error accumulated prior to an event such as a CPU read should not be applied to time after that event. After the second (or any) event signal, the first clock 10 may be activated once again.

EXAMPLE

The timing control apparatus may be implemented for first and second clocks that operate at different frequencies that may be used, for example, in operation of a notebook computer. The first clock (operating at the higher frequency) may require an accuracy measured in terms of parts per million (ppm) to be within a given specification tolerance. According to one specification, a high precision event clock is required to be accurate over a 1 millisecond (ms) period to within 0.05% (500 ppm or 500 nanoseconds (ns)).

If the first clock is running at the higher frequency with 300 ppm accuracy (e.g., $T_{Actual}$), then for a 1 ms period ($T_{Max}$=1 ms) an additional 200 ppm (200 ns) of unused error ($\Delta T = T_{Max} - T_{Actual}$=500 ns−300 ns=200 ns) can be tolerated within the given specification tolerance.

Continuing with this example, when the time between first and second event signals is 50 ms (e.g., the CPU or control software has not read the information from the timing control apparatus for 50 ms), then the cumulative unused error over 50 ms is computed as follows: Cumulative Unused Error=50 time periods ($T_{Max}$)×200 ns per time period=10 µs of unused error.

In one embodiment, the operating frequencies of the first and second clocks may be integers and/or multiples of one another. An interesting case may arise, however, when the frequencies of the clocks are not integers or multiples of one another. For example, in one application the first clock frequency may be 10 MHz and the second clock frequency may be 32.768 KHz. In this scenario, the count increment of the slower clock is 305.17578 times the count increment of the faster clock.

Because the clock frequencies are not integers or multiples of one another, switching between the clocks may introduce additional error that causes specification limits to be exceeded. This could translate into discontinuities or system errors. For example, because the second clock frequency is not an integer, the fractional 0.768 KHz of operating frequency of the second clock may be discarded when switching between clocks. As a result, an additional used counting error (or drift) of 570 ppm or ns may accumulate that may degrade performance.

Figure 4:
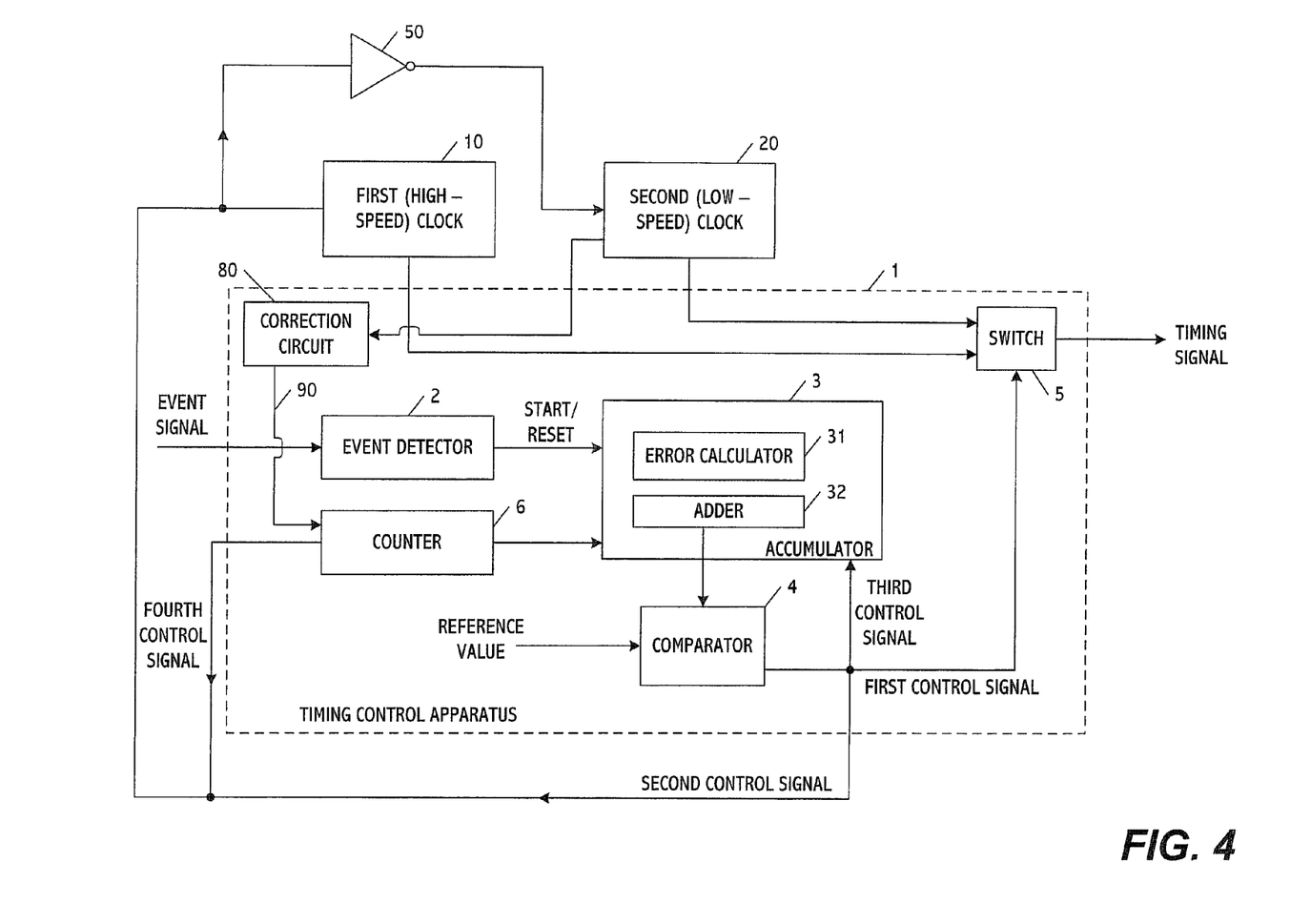
FIG. 4 shows another embodiment of a timing control apparatus.

FIG. 4 shows a correction circuit 80 that may be used with or included in the timing control apparatus in FIG. 1 to prevent this situation from arising when switching between the first and second clocks. The correction circuit 80 may operate to extend or shorten one or more time counts or increments of the second clock 20 over time based on a predetermined set of criteria. The criteria may be set to ensure that a certain amount of unused error is still available for switching to the second clock for power savings. (While this correction is described as being performed by a hardware circuit, in other embodiments the correction circuit 80 may be encoded into software).

In one implementation, the correction circuit 80 controls one or more count or time increments of the second clock 20 to correspond to an average rounded-down frequency or controls one or more count or time increments of the second clock 20 to correspond to an average rounded-up frequency.

For the rounded-down frequency, the second clock 20 is run at different time increments that cause a ratio of the operating frequency of the second clock 20 and the operating frequency of the first clock 10 to correspond to a rounded-down integer value. In accordance with at least one embodiment, the operating frequency of the first and second clocks may be understood to correspond to a count rate of a counter corresponding to the clocks.

Thus, if the first clock frequency is 10 MHz and the second clock frequency is 32.768 KHz, the slower clock is run at a count increment of 305.17578 times the count increment of the faster clock without correction. The correction circuit 80 may be implemented to run the second clock at one or more smaller count increments in order to cause the overall average count increment of the second clock to correspond to the rounded-down number of 305 times the count increment of the faster clock.

For the rounded-up frequency, the second clock 20 is run at different time increments that cause a ratio of the operating frequency of the second clock 20 and the operating frequency of the first clock 10 to correspond to a rounded-up integer value. In accordance with at least one embodiment, the operating frequency of the first and second clocks may be understood to correspond to a count rate of a counter corresponding to the clocks.

Thus, if the first clock frequency is 10 MHz and the second clock frequency is 32.768 KHz, the slower clock is run at a count increment of 305.17578 times the count increment of the faster clock without correction. The correction circuit 80 may be implemented to run the second clock at one or more greater count increments in order to cause the overall average count increment of the second clock to correspond to the rounded-up number of 306 times the count increment of the faster clock.

According to one example, six out of every 32 counts or time increments may be increased to give an average count increment of 305.1875, which is within 40 ppm or ns of the required value. This may leave a 460 ppm or ns unused error/drift available for the second clock while still remaining within specification limits.

Referring to FIG. 4, the correction circuit 80 may receive information (e.g., along signal line 70) indication of an operating frequency of the second clock. If the operating frequency is not an integer (e.g., has a factional component), correction circuit may be implemented to change one or more count or time increments in order to produce a rounded-up or rounded-down ratio of first clock to second clock frequencies. The count or time increments may be changed based on a control signal 90 send from the correction circuit 80 to the counter 6.

In another embodiment, a combination of count or time increment adjustments (increasing the increment in some cases and decreasing the increment in other cases) may be performed by the correction circuit 80 to reduce or eliminate drift error caused by the fraction portion of the operating frequency of the second clock 20, while still leaving enough unused error/drift in which the second clock 20 is operated to accomplish a power savings.

Figure 5:
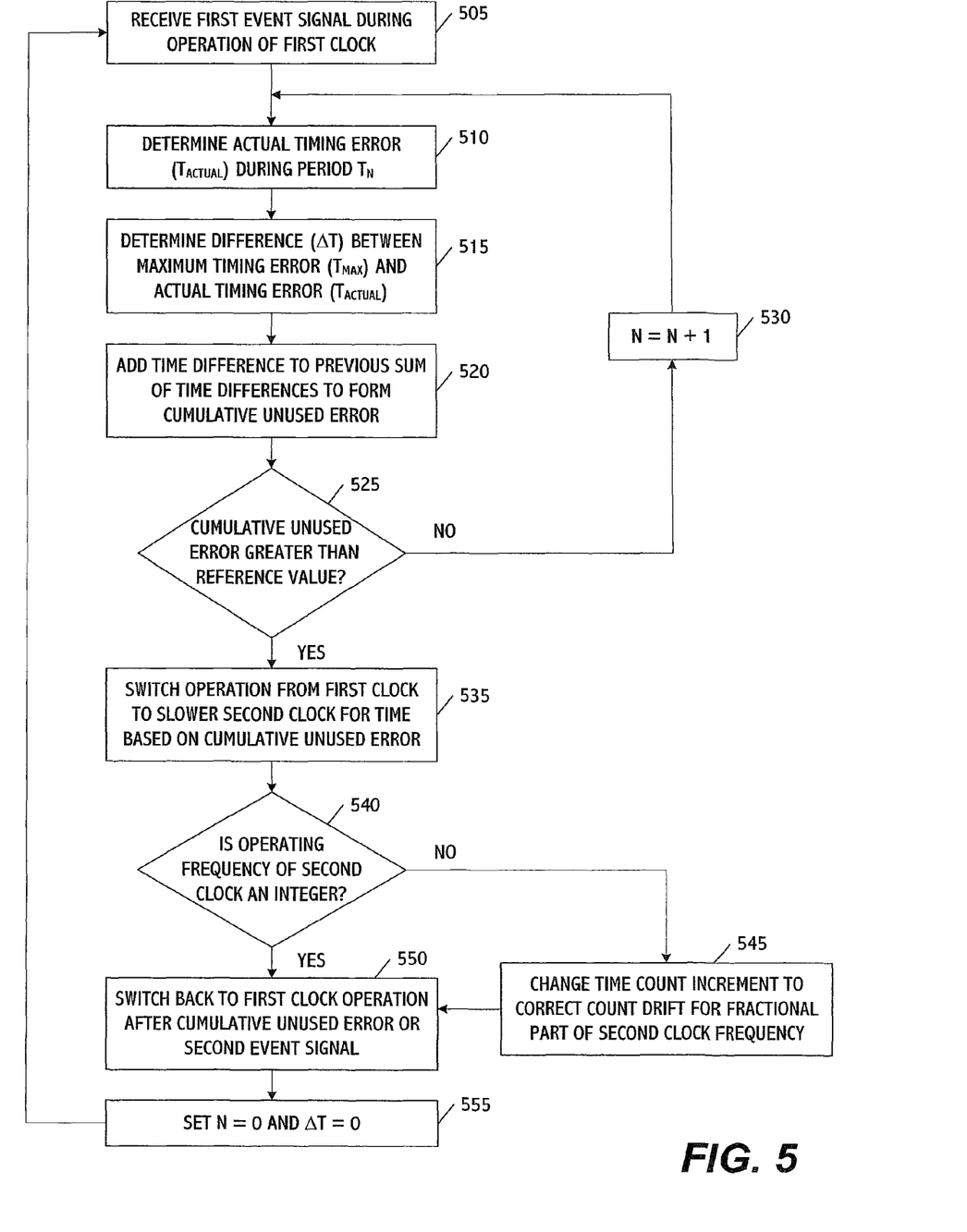
FIG. 5 shows an embodiment of a method for performing timing control.

FIG. 5 shows operations included in one embodiment of a method for controlling timing in an electronic device that includes clocks or timers operating at different frequencies. These operations may be performed by any of the apparatus embodiments disclosed herein or may be performed by a different apparatus.

An initial operation includes receiving a first event signal during operation of a first clock. (Block 505). The first clock operates at a greater frequency that a second clock, and the first event signal may correspond to, for example, access of the timing control apparatus by a central processing unit or other processor of a host device or system, an interrupt signal, or any one of a variety of other events or conditions that may arise in connection with operation of the host device or system or a chipset therein.

After the first event signal has been received, the first clock begins or re-starts operating over a plurality of periods, which, for example, has a maximum timing (drift or count) error that corresponds to the period $T_{Max}$ previously discussed. For each period ($T_N$), the actual timing error ($T_{Actual}$) is determined. (Block 510). Then, a computation is performed to determine a difference ($\Delta T$) between the actual timing error and the maximum allowable timing error ($T_{Max}$) during that period, e.g., $\Delta T = T_{max} - T_{Actual}$. (Block 515). (Re-starting of the first clock may correspond, for example, to the situation where the block could have always been working on the second clock, or alternatively may have started accumulating error from time zero). In one embodiment, the actual timing error may correspond to a worst possible actual timing error but this is not a necessity.

The computed time difference is then added to a sum of time differences corresponding to previous periods since the first event signal was received or since the first clock was re-started. (Block 520). When the time difference is computed for the initial period after receipt of the first event signal, the values of N and $\Delta T$ may equal zero or some other predetermined initial reference value.

The result of the computation in Block 520 is to generate a cumulative unused time error that is compared to a reference value in Block 525. The reference value may be set to or be based on a time period during which the second clock may operate in order to achieve a predetermined amount of power savings or this value may be set by other constraints or specification limits of the host system or device.

If the cumulative unused time error is not greater than the reference value, the value of N is incremented (Block 530) and the method returns to Block 510. If the cumulative unused time error is equal to or greater than the reference value, then operation is switched from the first clock to the second clock. During this time, the first clock may be deactivated in favor of operating the second clock. The second clock may be operated for a period that corresponds to or is otherwise based on the cumulative unused time error. (Block 535). Because the second clock has a lower frequency (e.g., operates based on a greater time count or increment) compared to the first clock, power savings may be achieved for the period the second clock operates instead of the first clock.

After the second clock operates for the aforementioned period or when a second event signal is received, operation switches back to the first clock and, for example, the second clock may be deactivated. (Block 550). At this time, the values of N and $\Delta$ are reinitialized to zero or their respective reference values (Block 555) and operation may return to Block 505 to repeat the method.

An optional set of operations may be performed to correct for the case where the first clock frequency is an integer and the second clock frequency is not an integer. In such a case (as previously explained), the fractional part of the operating frequency of the second clock may introduce errors or additional inaccuracies. These errors or inaccuracies may be compensated for by changing the time count increment (for example, using the correction circuit 80 for the count in the counter 6) so that the ratio of the first and second clock operating frequencies represents a rounded-up or rounded-down number. (Block 545). This operation may be performed, for example, between Blocks 540 and 550 in FIG. 5.

Figure 6:
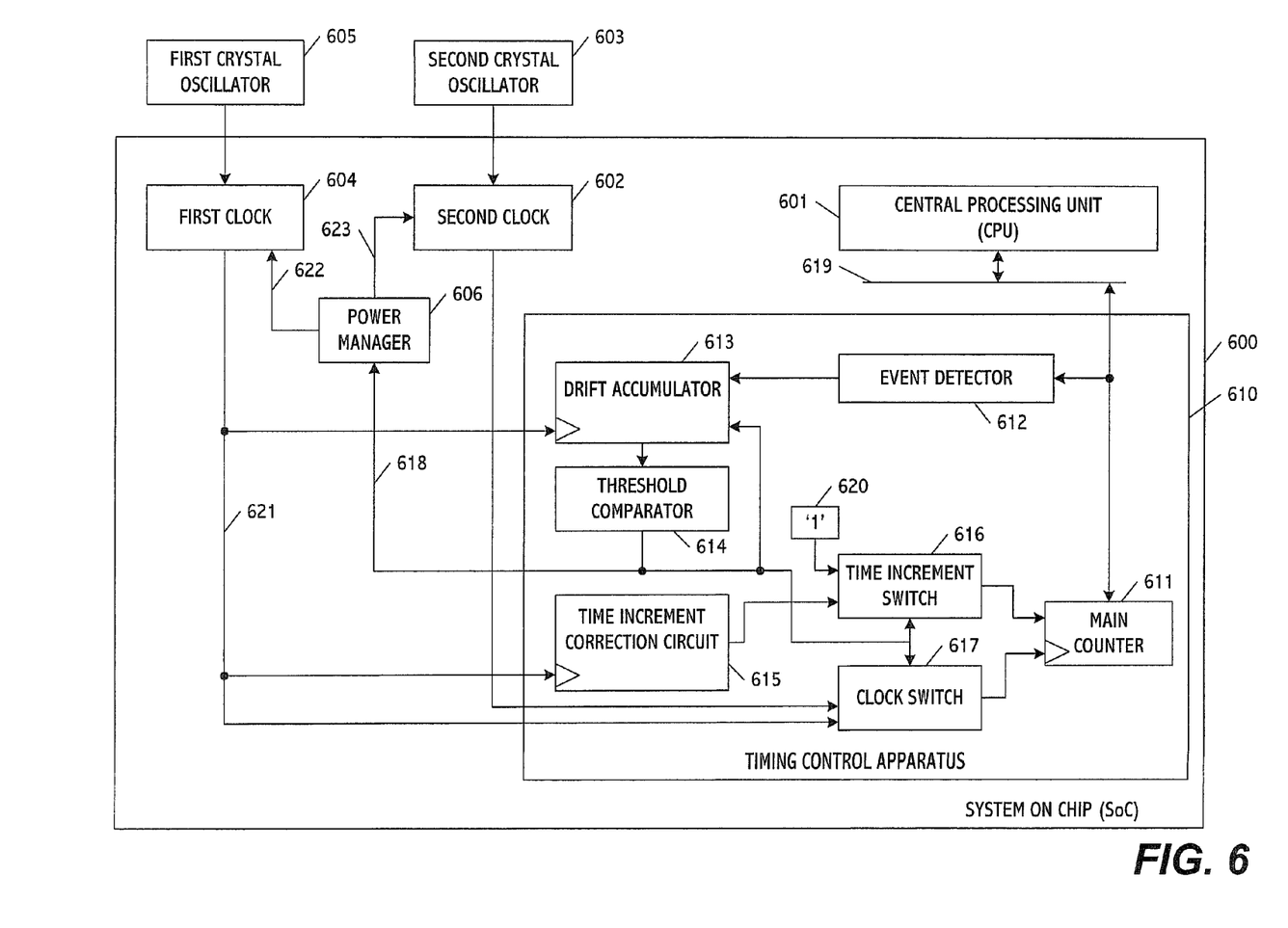
FIG. 6 shows another embodiment of a timing control apparatus.

FIG. 6 shows another embodiment of a timing control apparatus 610 that includes a specific configuration of timing and clock circuits applied to a host device that operates based on a central processing unit (or processor). In this embodiment, the timing control apparatus may be included in a system-on-chip (SoC) 600 incorporated within the host device.

The timing control apparatus 610 includes a first clock 604 and a second clock 602 which operates at different frequencies and, thus, with different count or time increments. The first clock 604 may operate slower than the second clock 602 and generates a clock signal based on a reference timing signal from a first crystal oscillator 605. The second clock 602 generates a clock signal based on a reference timing signal from a second crystal oscillator 603. The crystal oscillators may be located off the SoC chip 600 in one implementation.

The timing control apparatus also includes an event detector 612, a drift accumulator 613, a threshold comparator 614, and a time increment correction circuit 615. The event detector 612 may detect any one of a variety of event signals including an event signal from central processing unit (CPU) 601. The event signal from the CPU 601 may be generated, for example, as a result of the CPU attempting to read information from the timing control apparatus. This information may include count information from a main counter 611, which count information may be used as a basis for controlling an operation to be performed by the CPU 601 in the host device. (In one embodiment, the event signal may be sent to the timing control apparatus through a bus 619).

When the event detector 612 detects an event, the event detector 612 outputs a signal to the drift accumulator 613 which begins to count the unused error (e.g., unused drift) in each of a plurality of time periods, for example, as previously described relative to FIG. 2. As the unused error is accumulated over successive time periods, the threshold comparator 614 may compare the cumulative unused error to a threshold value. This comparison operation may be performed, for example, each time the cumulative unused error is changed or according to another predetermined change interval.

As long as the threshold value is not exceeded, the drift accumulator 613 and the comparator 614 continue to operate to compute and compare ever-increasing cumulative unused time error values. When the threshold value is exceeded, a control signal may be generated for output to a power manager 606 along signal line 618. Before this control signal is received, the power manager 606 may be supplying power to enable operation of the second (faster) clock 602. However, in response to the control signal from the comparator 614, the power manager 606 may switch off power to the second clock 602 to enable operation of the slower first clock 604 through respective control signals sent through signal lines 622 and 623. The power manager 606 may disable at least a portion of power to the second clock 602 and enable operation of the first clock 604.

A control signal from the comparator 614 may also be sent to the clock switch 617 to switch control of a main counter 611 from being controlled by the faster second' clock to being controlled by the slower first clock. The first clock output may be coupled to a switch 617 through a signal line 621. The first clock output may also be input into the drift accumulator 613 as a disable signal. Thus, the accumulator 613 may be disabled when the first clock 604 coupled to the main counter 611 and the accumulator 613 may be re-enabled when the first clock 604 is not coupled to the main counter (e.g., is disabled to once again allow operation of the second clock).

When the first clock 604 is enabled for operation and coupled to the main counter 611 through the switch 617, the first clock output may serve as an enable signal for the time increment correction circuit 615. The correction circuit 615 may perform a function similar to the correction circuit 80 in FIG. 4. The time increment to be added is illustrative shown by a predetermined increment value of 1 in box 620 (e.g., a processor or storage area) and is input into the main counter 611 through the time increment switch 616.

In other embodiments a different increment value may be used in the box 620 to achieve the rounded-up or rounded-down operation previously explained when the slower clock frequency is not an integer. If the first and second clock frequencies are integers or have an integer ratio, then the time increment correction circuit 615, the time increment switch 616, and box 620 may be omitted.

When the first clock 604 is disabled and the second clock 602 is enabled, the output of the first clock 604 may operate as a disable signal for the time increment correction circuit 615. The main counter 611 may be considered as outputting a timing signal to the CPU according to the functions previously described.

The following charts show example values obtained for the FIG. 6 embodiment.

| Fast Clock Period (ns) | 100 |
| Specification Drift (ppm) | 500 |
| Actual Drift (ppm) | 300 |
| Slow Clock Period (ns) | 30517.57813 |
| Time Correction Count for Slow Clock | 305.1875 |
| Slow Clock Drift (ppm) | 450 |
| Threshold (ns) | 200000000 |
| Ideal Slow Clock Count | 305.1757813 |
| Count Error (ppm) | −38.4 |

Figure 7:
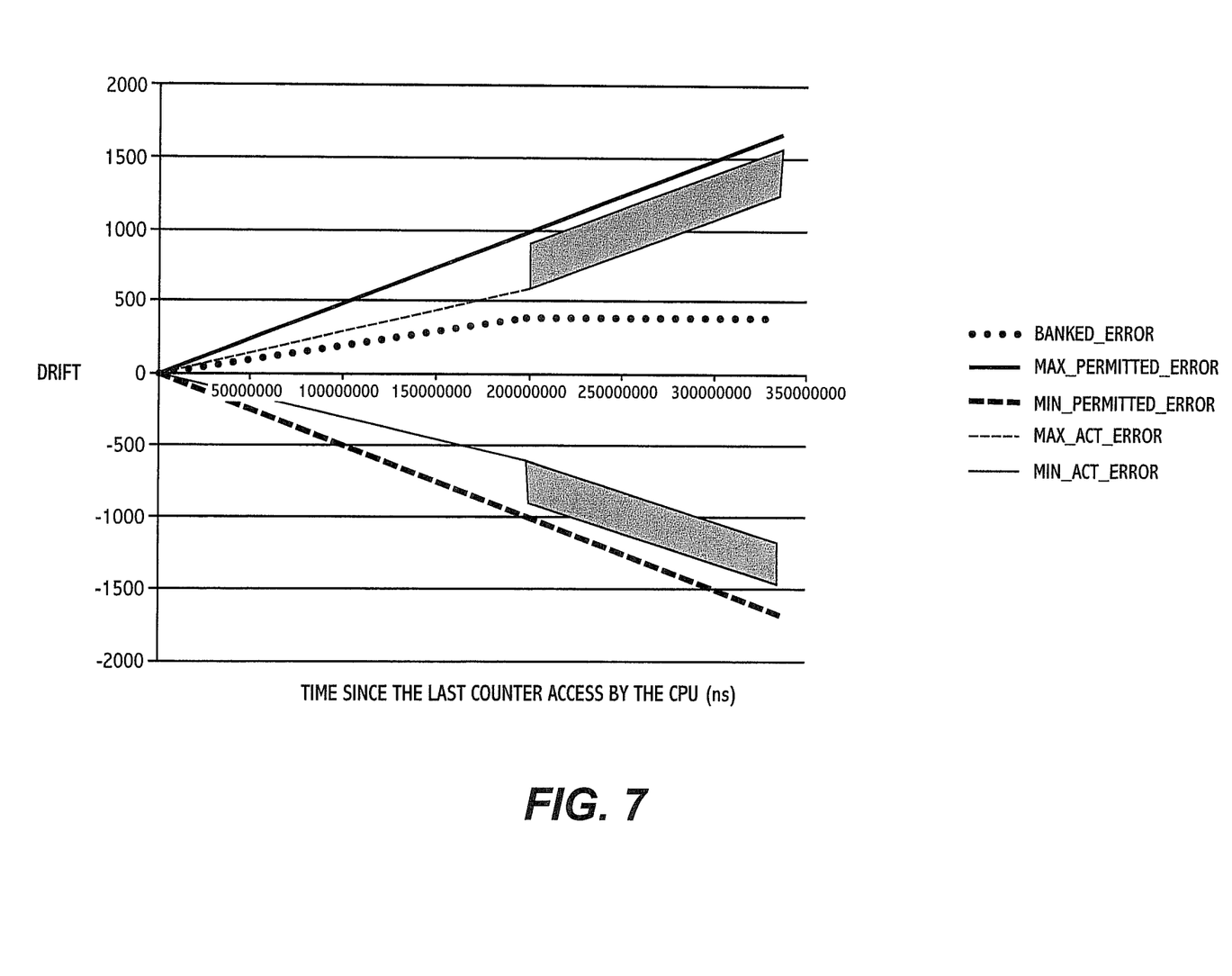
FIG. 7 shows a graph of an example of the apparatus of FIG. 6.

In this example, until time 200000000 ns (0.2 seconds), the main counter 611 is operating on the fast clock. The curves corresponding to Max_act_error and Min_act_error represent actual possible accumulated error caused by fast clock drift. This can be seen to be within limits of the permitted tolerance error corresponding to the Max_permitted_error and the Min_permitted_error curves. At this time (0.2 seconds), the cumulative (banked) time error, which is basically an indication of the distance between the actual possible errors and the permitted errors, has reached a count value of 400. At this point, the slower clock may be used to count with bigger time increments (of 305 or 306). The possible actual errors may jump around in value considerably, but because there is a margin of error of 400 ppm banked, operation still remains within specification limits.

In accordance with another embodiment, a computer-readable medium may store instructions or code for controlling a processor to perform all or a portion of the operations described relative to the method embodiments. The computer-readable medium may be, for example, an internal memory of the host device or processor preprogrammed by a device designer or manufacturer.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Also, the features of any one embodiment described herein may be combined with the features of one or more other embodiments to form additional embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

I claim:

1. An apparatus comprising:
an adder to add unused time error in each of a plurality of periods to form a cumulative value, wherein, the unused time error is to occur during operation of a first clock; and
a comparator to compare the cumulative value to a reference value, wherein a control signal is to be generated to switch from the first clock to a second clock based on an output of the comparator, and wherein a frequency of the first clock is to be greater than a frequency of the second clock, and the first clock is to be switched to the second clock to maintain operation of the second clock for an amount of time based on the cumulative value of the unused time error.

2. The apparatus of claim 1, further comprising:
a calculator to compute the unused time error in each of the periods,
wherein the unused time error computed by the calculator is to be based on a difference between an actual time error and a maximum allowable time error in respective ones of the periods.

3. The apparatus of claim 1, further comprising:
an event detector to detect an event signal, wherein the unused time error is to be determined in response to an output of the event detector.

4. The apparatus of claim 3, wherein the event signal is to be based on a central processing unit read operation.

5. The apparatus of claim 1, further comprising:
a counter to count a time based on the cumulative value,
wherein a switch operation is to be performed to switch the second clock to the first clock after the counter counts the time that is based on the cumulative value.

6. The apparatus of claim 5, wherein the adder is to be reset to an initial value after the counter counts the time that is based on the cumulative value.

7. The apparatus of claim 1, further comprising:
a correction circuit to correct a time increment of the second clock when the frequency of the first clock is not an integer multiple of the frequency of the second clock.

8. The apparatus of claim 7, wherein the correction circuit is to perform a round-up operation or a round-down operation to set a ratio of the frequencies of the first and second clocks to an integer value.

9. The apparatus of claim 1, further comprising a power manager to receive a control signal and to disable at least a portion of power of the second clock and to enable operation of the first clock.

10. The apparatus of claim 1, wherein a control signal to cause a power manager logic to disable at least a portion of power to the second clock and to enable operation of the first clock.

11. A method for controlling timing for a device, comprising:
adding unused time error in each of a plurality of periods to form a cumulative value;
comparing the cumulative value to a reference value; and
generating a control signal to switch operation from a first clock to a second clock based on a result of the comparing, wherein the unused time error is determined during operation of the first clock, and wherein a frequency of the first clock is greater than a frequency of the second clock, and the control signal is generated to maintain operation of the second clock for an amount of time based on the cumulative value of the unused time error.

12. The method of claim 11, wherein the unused time error is based on a difference between an actual time error and a maximum allowable time error in respective ones of the periods.

13. The method of claim 11, further comprising:
detecting an event signal,
wherein the unused time error is determined in response to the event signal.

14. The method of claim 13, wherein the event signal is to be based on a central processing unit read operation.

15. The method of claim 11, further comprising:
counting a time based on the cumulative value; and
generating a control signal to switch from the second clock to the first clock after the counter counts the time that is based on the cumulative value.

16. The method of claim 15, further comprising:
correcting a time increment of the second clock when the frequency of the first clock is not an integer multiple of the frequency of the second clock.

17. The method of claim 16, wherein said correcting includes:
performing a round-up operation or a round-down operation to set a ratio of the frequencies of the first and second clocks to an integer value.

18. The method of claim 11, further comprising disabling at least a portion of power for the second clock and enabling operation of the first clock.

19. A non-transitory machine readable medium to store instructions executable by logic to perform a method comprising:
adding unused time error in each of a plurality of periods to form a cumulative value;
comparing the cumulative value to a reference value;
generating a control signal to switch operation from a first clock to a second clock based on the comparing, wherein the unused time error is determined during operation of a first clock, and wherein a frequency of the first clock is greater than a frequency of the second clock, and the control signal is generated to maintain operation of the second clock for an amount of time based on the cumulative value of the unused time error.

20. The non-transitory machine readable medium of claim 19, wherein the unused time error is based on a difference between an actual time error and a maximum allowable time error in respective ones of the periods.

21. The non-transitory machine readable medium of claim 19, wherein the method further comprises detecting an event signal, wherein the unused time error is determined in response to the event signal.

22. The non-transitory machine readable medium of claim 19, wherein the method further comprises:
counting a time based on the cumulative value; and
generating a control signal to switch from the second clock to the first clock after the counter counts the time that is based on the cumulative value.

* * * * *